United States Patent [19]
Kondo

[11] 4,097,879
[45] Jun. 27, 1978

[54] DEVICE IN A CAMERA FOR IMPARTING PICTURES ON A PHOTOGRAPHIC FILM WITH A TOP-AND-BOTTOM INDICATION

[75] Inventor: Toshihiro Kondo, Chofu, Japan

[73] Assignee: Fuji Photo Film Co., Ltd., Minamiashigara, Japan; a part interest

[21] Appl. No.: 727,423

[22] Filed: Sep. 28, 1976

[30] Foreign Application Priority Data

Oct. 17, 1975 Japan .............................. 50-125177

[51] Int. Cl.² .............................................. G03B 17/24
[52] U.S. Cl. ........................................ 354/106; 356/249
[58] Field of Search ............... 354/105, 106, 107, 108, 354/72; 356/248, 249, 250; 33/331

[56] References Cited

U.S. PATENT DOCUMENTS

| | | | |
|---|---|---|---|
| 1,674,540 | 6/1928 | Bagley | 354/106 |
| 1,886,052 | 11/1932 | Sconnell | 354/106 |
| 3,661,061 | 5/1972 | Tokarz | 354/106 |
| 3,675,549 | 7/1972 | Adair | 354/105 |
| 3,866,602 | 2/1975 | Furihata | 354/105 X |
| 3,891,328 | 6/1975 | Hall | 356/249 |

FOREIGN PATENT DOCUMENTS

| | | | |
|---|---|---|---|
| 1,497,587 | 10/1967 | France | 354/105 |
| 137,519 | 5/1902 | Germany | 354/105 |

*Primary Examiner*—Edna M. O'Connor
*Attorney, Agent, or Firm*—Harold L. Stults; Pasquale A. Razzano

[57] ABSTRACT

A transparent liquid container half-filled with opaque liquid is provided in front of a film in a camera body to cover a small portion of the area of a single frame. The shadow of the opaque liquid is recorded on the film when a focal plane shutter is opened to expose the film to take a picture. Alternatively, an arrow shaped rotatable member having a weighted tail end is provided in front of the film. The shadow of the opaque liquid or that of the arrow shaped member indicates the top and bottom of the picture recorded on the film.

13 Claims, 10 Drawing Figures

DEVICE IN A CAMERA FOR IMPARTING PICTURES ON A PHOTOGRAPHIC FILM WITH A TOP-AND-BOTTOM INDICATION

BACKGROUND OF THE INVENTION

1. Field of the Invention

This invention relates to a device for recording on a photographic film marks which indicate the top and bottom of pictures photographed thereon, and more particularly to a device provided in a camera body for recording on a photographic film loaded therein a mark which indicates the top and bottom of the picture photographed thereon when the picture is taken by the camera.

2. Description of the Prior Art

It is sometimes desired that the top and bottom of pictures carried on a photographic film be indicated. For example, in a color printer in which color pictures are printed on a number of color papers from a color film which carries a number of negative images of color pictures, various kinds of correction are made to obtain color photographs of balanced color. Some corrections of color balance are made automatically when the top and bottom of the picture is known. In case of special scientific photos such as microscopic photos and photos of strata or the like, it is very difficult to discern the top and bottom of the pictures. Further, in case of transparencies for a slide projector, it if often desired that the top and bottom be indicated so that the transparencies will easily be oriented in the right position in the slide projector when they are projected.

In view of the correction conducted in the color printer, the marks which indicate the top and bottom of the pictures should preferably be provided on the film in such a manner that the marks can be automatically detected in a color printer. For this reason, the marks should preferably be detectable by electro-optical detecting means.

SUMMARY OF THE INVENTION

It is, therefore, the primary object of the present invention to provide a device for recording on a film marks, which indicate the top and bottom of the pictures photographed thereon, when the pictures are photographed thereon.

Another object of the present invention is to provide a device for recording on a film marks which indicate the top and bottom of the pictures photographed thereon and can be detected by electro-optical detecting means.

Still another object of the present invention is to provide a device for recording on a film marks which indicate that a picture is photographed in a horizontal position, namely, that the picture is photographed with the optical axis of the taking lens of the camera oriented vertically, as well as marks which indicate the top and bottom of the pictures.

The above objects are accomplished by providing in a camera body a means which indicates the direction of gravitation. The means which indicates the direction of gravitation comprises, for instance, a transparent container half filled with an opaque liquid or an arrow one end of which is weighted. The half-filled liquid container is always filled with the opaque liquid in the lower half portion thereof, thereby indicating the top and bottom by the position of the liquid. The arrow which has a weight fixed at its tail end always indicates the direction of the top with its arrow head.

The indicating means is provided in front of the film loaded in the camera and the shadow thereof is recorded on the film by use of light incident through the taking lens or a light introducing window of the camera or a light source particularly provided within the camera body. The shadow of the indicating means is recorded on the film in response to opening of the shutter or to turning on of the light source within the camera body. Thus, the mark which indicate the top and bottom of the picture is recorded on the film simultaneously with the taking of the picture. The marks may be recorded at the corner of picture frames or outside the picture frames. The number of the marks per frame need not be limited to one, but may be more than one.

DESCRIPTION OF THE PREFERRED EMBODIMENTS

Figure 1:
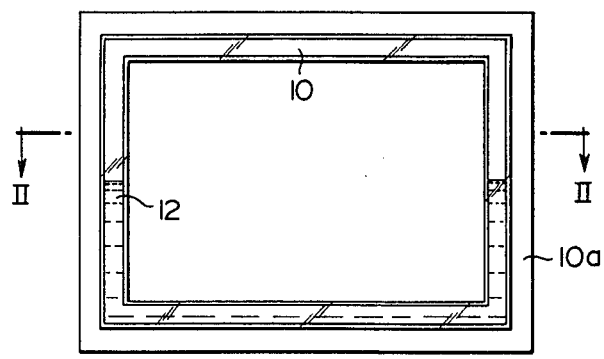
FIG. 1 is a front view of a top and bottom mark recording device in accordance with a first embodiment of the present invention.
Figure 2:
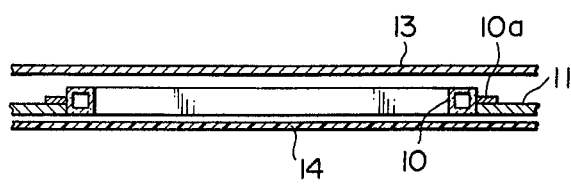
FIG. 2 is a horizontal sectional view of the device shown in FIG. 1 taken along line II—II.
Figure 3:
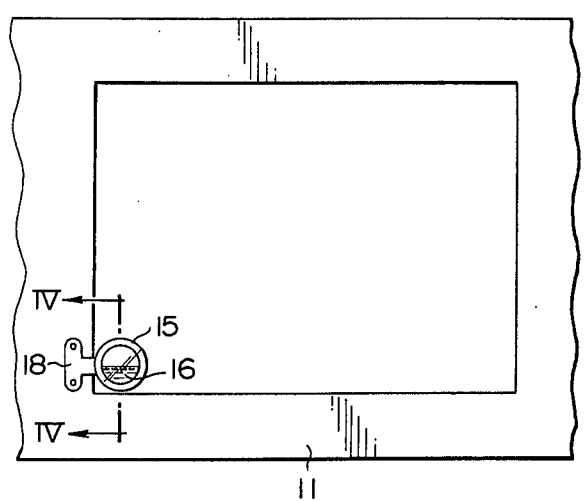
FIG. 3 is a front view of a mark recording device in accordance with a second embodiment of the present invention illustrated together with an aperture frame of a camera.

A first embodiment of the mark recording device in accordance with the present invention is illustrated in FIGS. 1 and 2. As shown in FIG. 1, a rectangularly shaped frame made of square cross-sectioned transparent pipe constitutes a liquid container 10 which is half filled with opaque liquid 12. The liquid container 10 has a flange 10a on the outer face thereof as shown in FIG. 2, which is fixed to an aperture frame 11 of a camera. Thus, the half filled liquid container 10 is mounted on the interior of an aperture frame 11. The liquid container 10 is located between a shutter 13 and a film 14 as shown in FIG. 2 so that the shadow of the opaque liquid 12 in the liquid container 10 may be recorded on the film 14 when the shutter 13 is opened. As shown in FIG. 1, the opaque liquid 12 occupies the lower half of the rectangularly shaped transparent liquid container 10, and accordingly, is in the form of an angular U. Since the liquid container 10 is in the form of an endless pipe and the liquid 12 contained therein freely flows therethrough, the liquid 12 always occupies the lower half of the container 10. Therefore, from the position of the image of the opaque liquid 12 recorded on the film 14, it is possible to know the top and bottom of the image. Namely, the angular U shaped image of the opaque liquid 12 indicates the bottom of the picture photographed on the film 14.

When the camera is in the position where the aperture frame 11, and accordingly the film 14 too, is on a horizontal plane, the liquid container 10 is horizontally oriented and accordingly the opaque liquid 12 spreads over the entire area of the container 12. Thus, a rectangular image of the opaque liquid 12 is recorded on the film 14, which indicates that the photo was taken with the film oriented horizontally.

Further, in accordance with the first embodiment of the invention hereinabove described, when the photo is taken with the camera body inclined forward at an angle, the length of the U-shaped shadow of the opaque liquid 12 increases. Therefore, the angle of the camera can be known from the length of the U-shaped mark recorded on the film 14. By providing scales on the transparent liquid container 10, it is possible to record the angle of inclination of the camera.

Figure 4:
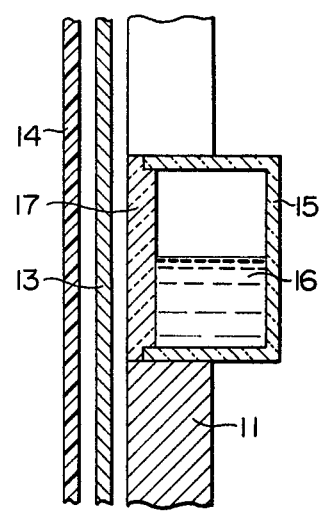
FIG. 4 is an enlarged side sectional view of the device shown in FIG. 3 taken along line IV—IV.

FIGS. 3 to 6 show a second embodiment of the present invention which employs a cylindrical transparent liquid container 15 half filled with opaque liquid 16. The cylindrical transparent liquid container 15 is comprised of a cylindrical liquid receptacle portion having an open end and a cover 17 which closes said open end, and is positioned with the axis of the cylindrical portion oriented normal to the film plane as shown in FIG. 4. The container 15 has a foot 18 and is fixed thereby to a corner of the aperture of an aperture frame 11 located in front of a shutter 13 and a film 14 so that the shadow of the opaque liquid 16 in the transparent container 15 may be recorded in a corner of a picture photographed on the film 14. The opaque liquid 16 in the cylindrical container 15 is in the form of semi-circle which has its arc under its chord, the chord indicating a horizontal line. Therefore, by the shape of the semi-circle recorded on a film, the top and bottom of the picture are indicated. When the camera is positioned with its film plane oriented in a horizontal plane when a picture is taken, a circular mark is recorded on the film 14. In this embodiment, a plurality of cylindrical containers may be provided along the margin of the aperture of the aperture frame 11. By providing a plurality of cylindrical containers at different positions along the margin of the aperture, the chance of the mark being superimposed with a black portion of the picture and becoming non-recognizable is greatly reduced.

Figure 5:
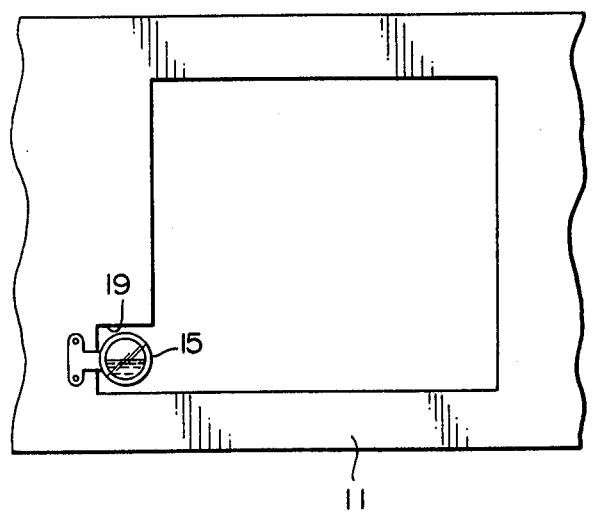
FIGS. 5 and 6 are front views which show two possible positions of the mark recording device in accordance with the second embodiment of the present invention as shown in FIGS. 3 and 4.
Figure 6:
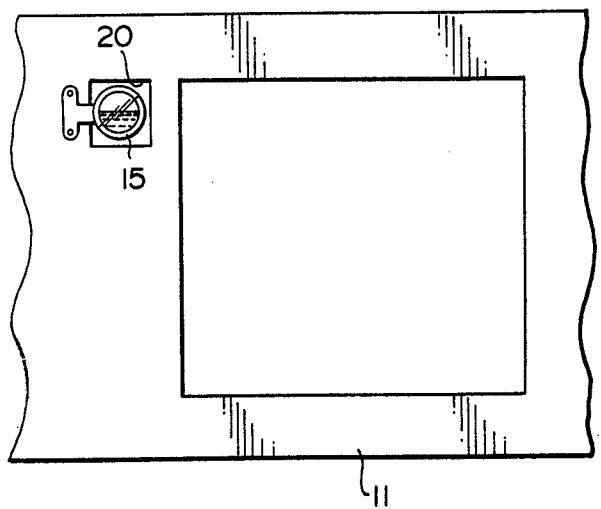

FIGS. 5 and 6 show alternative locations of the liquid container 15. In the alternative shown in FIG. 5, a rectangular cut-away portion 19 is formed at a corner of the aperture of the aperture frame 11. In the latter alternative shown in FIG. 6, a rectangular window 20 is provided in the aperture frame 11. In these alternatives, the mark is recorded on the film outside the picture frame thereof, and accordingly there is no fear of superimposition of the mark with a black portion of the picture.

In the above described embodiments, the shadow of the opaque liquid contained in the transparent liquid container is recorded on the film when the shutter is opened by use of light incident through a taking lens of the camera. The light used for recording the mark on the film may be guided through a light introducing window particularly provided within the camera. Further, the light outside the camera can be introduced to the mark recording means by use of a light guide means such as a light guide of optical fibers. Alternatively, a light source may be provided within the camera body to record the mark on the film separately from the picture. In this case also, the shutter, if of focal plane type, used for photographing can be used to record the mark on the film. The light source may be a lamp or other electrically energized one. In this case, it is possible to record the mark on the film without using the shutter by electrically energizing the light source in synchronization with the release of the normal shutter. By providing the light source, it becomes possible to selectively record the mark on the film. In other words, when it is not necessary to record the mark in a corner of the picture, the light source is not energized.

Figure 7:
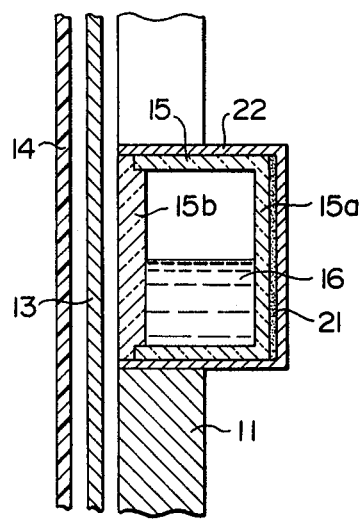
FIG. 7 is an enlarged side sectional view of a mark recording device in accordance with a third embodiment of the present embodiment.

Further, it is also possible to use a non-electric light source which emits light without being supplied with electric power. An example of such a light source is a luminescent material which emits luminescence. FIG. 7 illustrates an embodiment which employs the luminescent material as a light source. Referring to FIG. 7, a cylindrical liquid container 15 half-filled with opaque liquid 16 is provided in front of a shutter 13 and a film 14. The front face 15a of the container 15 is provided thereon with a layer of luminescent material 21. Further, a coating of a light shielding material is applied over the luminescent material coating layer 21 and the cylindrical container 15. Only the back face 15b of the container 15 is not provided with a coating to pass therethrough the light emitted from the luminescent layer 21 toward the film 14. When the shutter 13 is opened, the shadow of the opaque liquid 16 is recorded on the film 14 in the similar manner as that employed in the foregoing embodiment as shown in FIGS. 3 to 6.

Figure 8:
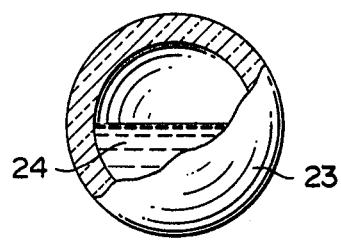
FIG. 8 is a partly cut-away view of a mark recording device in accordance with a fourth embodiment of the present invention.

FIG. 8 shows a fourth embodiment of the present invention which employs a spherical liquid container 23 half filled with opaque liquid 24. In accordance with this embodiment, the shape of the shadow of the opaque liquid 24 recorded on the film indicates the angle of the camera body.

Figure 9:
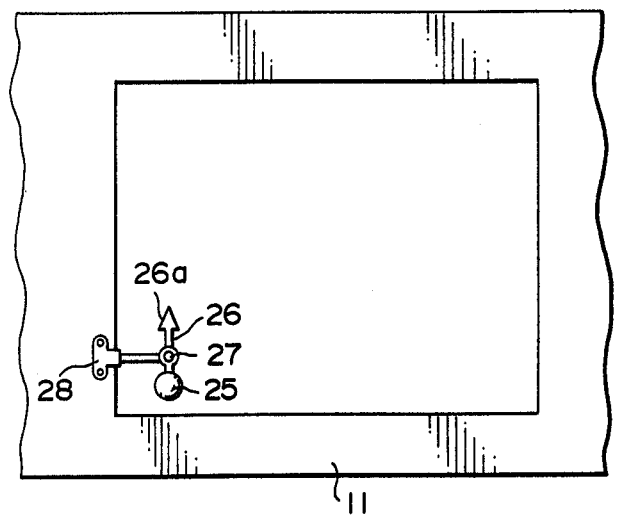
FIG. 9 is a front view of a mark recording device in accordance with a fifth embodiment of the present invention illustrated together with an aperture frame of a camera.

FIG. 9 shows a fifth embodiment of the present invention which employs a mechanical gravitation indicating means. A weight 25 is fixed to the tail end of an arrow shaped member 26 which is rotatably mounted on a bracket 28 by means of a universal bearing 27. The bracket 28 is fixed to a corner of the aperture of an aperture frame 11. Since the weight 25 tends to be at the lowest position, the arrow head 26a of the arrow shaped member 26 always indicates the direction of the top of the picture photographed. The shadow of the arrow shaped member 26 is recorded on the film in a similar manner to that employed in the foregoing embodiments. When the picture is taken with the camera oriented horizontally, the shadow of the arrow shaped member 26 is superimposed with the shadow of the weight 25, which indicates that the picture was taken in the horizontal position.

Figure 10:
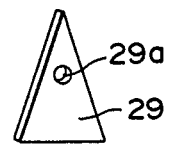
FIG. 10 is a perspective view of a mark recording device in accordance with a sixth embodiment of the present invention.

FIG. 10 shows another example of a mechanical gravity indicating means which can be employed in the present invention instead of the arrow shaped member 26. An isosceles triangular member, i.e. an arrow head shaped member, 29 has a hole 29a for pivotal mount thereof to a support. The position of the hole 29a is not at the center of gravitation so that the isosceles triangular member 29 may always indicate the direction of gravitation, i.e. the top and bottom. Namely, the hole 29a is positioned biased from the center of gravity toward the most acute apex of the isosceles triangle so that the apex will always indicate the direction of the top.

I claim:

1. In a device for recording marks on a film indicating the top and bottom of picture images on a photographic film in a camera at the time the respective frames of the film are exposed, the combination of, a container having a pair of transparent walls spaced from each other and parallel to the general plane of a film frame positioned to record a photographic image in the camera, said walls defining an open cavity therebetween, said cavity being so positioned that light passing through said transparent walls strikes said photographic film in or adjacent the periphery of said frame, and a body of opaque liquid within said cavity and having a volume of the order of not greater than one-half the volume of said cavity whereby the liquid prevents the passage of light through the lower portion of said cavity while light passes through at least the upper half of said cavity to thereby produce a distinctive marking in or adjacent the periphery of each picture image on the photographic film.

2. A device as defined in claim 1 wherein said transparent walls form a rectangularly shaped frame made of square cross-section, said frame being mounted on an aperture frame in the camera to define an aperture through which the film is exposed.

3. A device for recording marks on a film as defined in claim 2 wherein said rectangularly shaped frame is provided with scales therealong.

4. A device for recording marks on a film as defined in claim 1 wherein said container is cylindrical with its axis normal to the film in the camera.

5. A device for recording marks on a film as defined in claim 4 wherein said cylindrical container is located in front of the film in the camera at a corner of a picture frame of the film.

6. A device for recording marks on a film as defined in claim 4 wherein said cylindrical container is located in front of the film in the camera outside said frame of the film.

7. A device for recording marks on a film as defined in claim 1 wherein said transparent liquid container is a spherical container.

8. A device for recording marks on a film as defined in claim 1 which includes a light source and a shutter means provided between said frame of the film in the camera and the light source.

9. A device for recording marks on a film as defined in claim 8 wherein said light source is light reflected from the object to be photographed which is introduced through a taking lens of the camera.

10. A device for recording marks on a film as defined in claim 8 wherein said light source is the ambient light introduced into the camera body through a light guide means provided on the camera.

11. A device for recording marks on a film as defined in claim 8 wherein said light source is an electric light source provided within the camera body.

12. A device for recording marks on a film as defined in claim 8 wherein said light source is a luminescent material provided within the camera body.

13. A device for recording marks on a film as defined in claim 12 wherein said luminescent material is in the form of a coating layer on the container.

* * * * *